United States Patent [19]

Fujimoto

[11] 4,418,758
[45] Dec. 6, 1983

[54] TRACTIVE FORCE SENSING SYSTEM FOR TRACTOR

[75] Inventor: Tsutomu Fujimoto, Fujiidera, Japan
[73] Assignee: Kuboto, Ltd., Osaka, Japan
[21] Appl. No.: 244,120
[22] Filed: Mar. 16, 1981
[30] Foreign Application Priority Data Jul. 16, 1980 [JP] Japan .......................... 55-101089[U]

[51] Int. Cl.³ ...................... A01B 63/112; B60D 1/00
[52] U.S. Cl. .................................... 172/7; 280/446 A
[58] Field of Search ....................... 180/446 A, 446 R; 172/7, 9, 10

[56] References Cited

U.S. PATENT DOCUMENTS 2,864,295  12/1958  DuShane ................................. 172/9
4,142,733  3/1979  Bernini ............................ 280/446 A Primary Examiner—Joseph F. Peters, Jr.
Assistant Examiner—Donn McGiehan
Attorney, Agent, or Firm—Cushman, Darby & Cushman

[57] ABSTRACT

A tractive force sensing system for tractor provided with a hydraulic device for tractor having a draft control function to actuate an oil pressure control valve through a draft cam by tractive load from lower links. Tractive force will be sensed by the resilient bent and deformation of a lower link support, and such bent and deformation of the support will be converted into the swing of a first feedback link 35', thereby to directly actuate a draft cam, whereby an oil pressure control valve interlockingly connected to the draft cam will be actuated.

2 Claims, 8 Drawing Figures

TRACTIVE FORCE SENSING SYSTEM FOR TRACTOR

BACKGROUND OF THE INVENTION (1) Field of the Invention

The present invention relates to a tractive force sensing system for tractor, and more particularly to such system provided with a hydraulic device for a tractor having a draft control function to actuate an oil pressure control valve through a draft cam by tractive load from lower links.

(2) Description of the Prior Art

In order to provide a better understanding of a conventional tractive force sensing system for tractor, the description hereinafter will discuss such conventional tractive force sensing system including the relevant members, with reference to FIGS. 7 and 8.

A conventional feedback interlocking link means 26 shown in FIGS. 7 and 8, comprises a first vertical feedback link 35 and two links (second and third feedback links 36 and 37) for changing the direction of the swing movement of the first feedback link 35 so as to correspondingly actuate a draft cam 23.

The first feedback link 35 is pivotally supported by a pivot shaft 43 disposed at the frontal intermediate portion thereof, and is adapted to receive the movement of a support 31 in the F1 direction, by a follower cam 39 projectingly disposed at the lower end of the link 35. Therefore, the upper end of the link 35 is correspondingly inclined backward. Such backward inclination of the first link 35 is reverse to the forward rotation of a draft cam 23. In this connection, it is required to dispose two links 36 and 37 for changing the transmission direction of operation. Such mechanical and incorporated system is proposed for ease of assembling and disassembling. However, since it is necessary to dispose a plurality of links 36 and 37 for changing the transmission direction of operation as mentioned earlier, the promotion of assembling and disassembling efficiency cannot be fully realized.

Furthermore, since there are a number of parts to be connected, precise draft control cannot be sufficiently performed. Moreover, there are still problems as to durability and replacement of parts.

The description of other component elements shown in FIGS. 7 and 8 is omitted, since the general construction of such conventional tractive force sensing system except for the main portions thereof, is substantially the same as the general construction of a tractive force sensing system in accordance with the present invention to be discussed later. Therefore, such other component elements and their operations will be fully understood merely by referring to the detailed description of an embodiment of the present invention.

SUMMARY OF THE INVENTION

It is an object of the present invention to provide improvements in the tractive force sensing system of the type mentioned earlier.

The tractive force sensing system for tractor provided with a hydraulic device for tractor having a draft control function adapted to actuate an oil pressure control valve through a draft cam by tractive load from lower links, in accordance with the present invention, comprises a lower link support transversely passed through the inside of the lower portion of a transmission case of a vehicle body and adapted to be resiliently bent and deformed by the tractive load; a first feedback link having a follower cam in contact with the axial center portion of the lower link support, and pivoted at the lower end thereof by the lower portion of the vehicle body; and a second feedback link for interlockingly connecting the upper end of the first feedback link to the draft cam so as to directly actuate the draft cam.

As compared with the conventional tractive force sensing system of the incorporated-link type mentioned earlier which presents an advantage in mounting and disassembling, the present invention can realize further simplification of the link mechanism. Such simplification of the link mechanism further facilitates the mounting and disassembling.

Moreover, since the general structure is much simplified, a precise draft control can be realized and improvements in durability can be achieved.

Other objects and advantages of the present invention will be apparent from the following description.

BRIEF DESCRIPTION OF THE DRAWINGS

The present invention will further be described, by way of example, with reference to the accompanying drawings, in which.

DETAILED DESCRIPTION OF THE PREFERRED EMBODIMENTS

Figure 1:
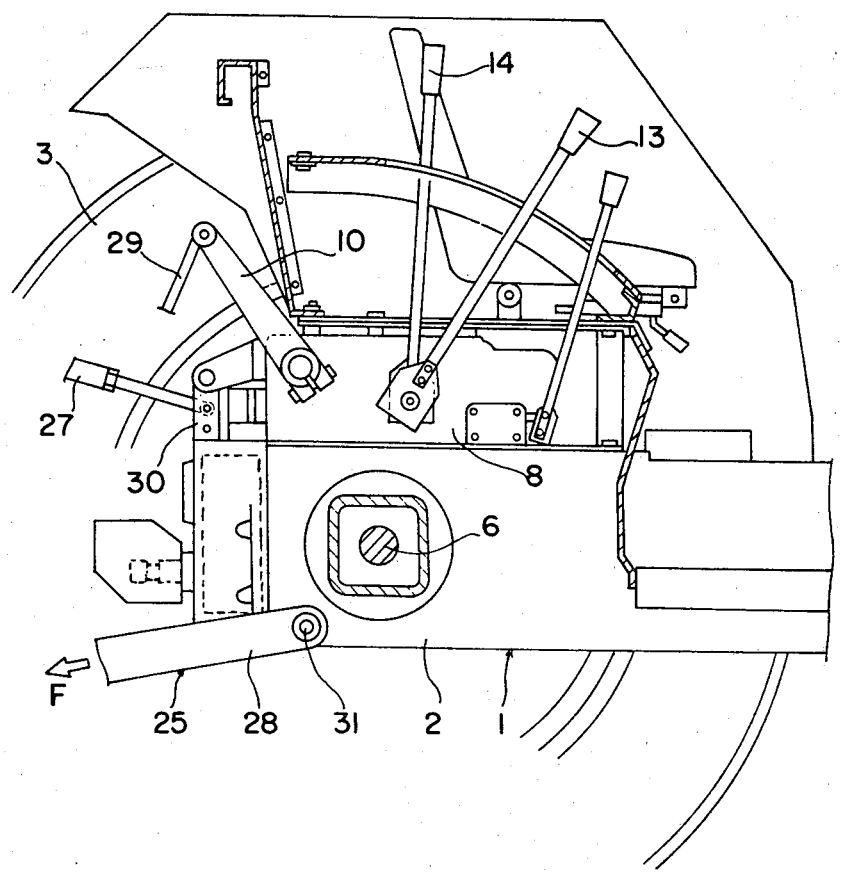
FIG. 1 is a section view in side elevation of the rear portion of a tractor incorporating a tractive force sensing system for tractor in accordance with the present invention.
Figure 2:
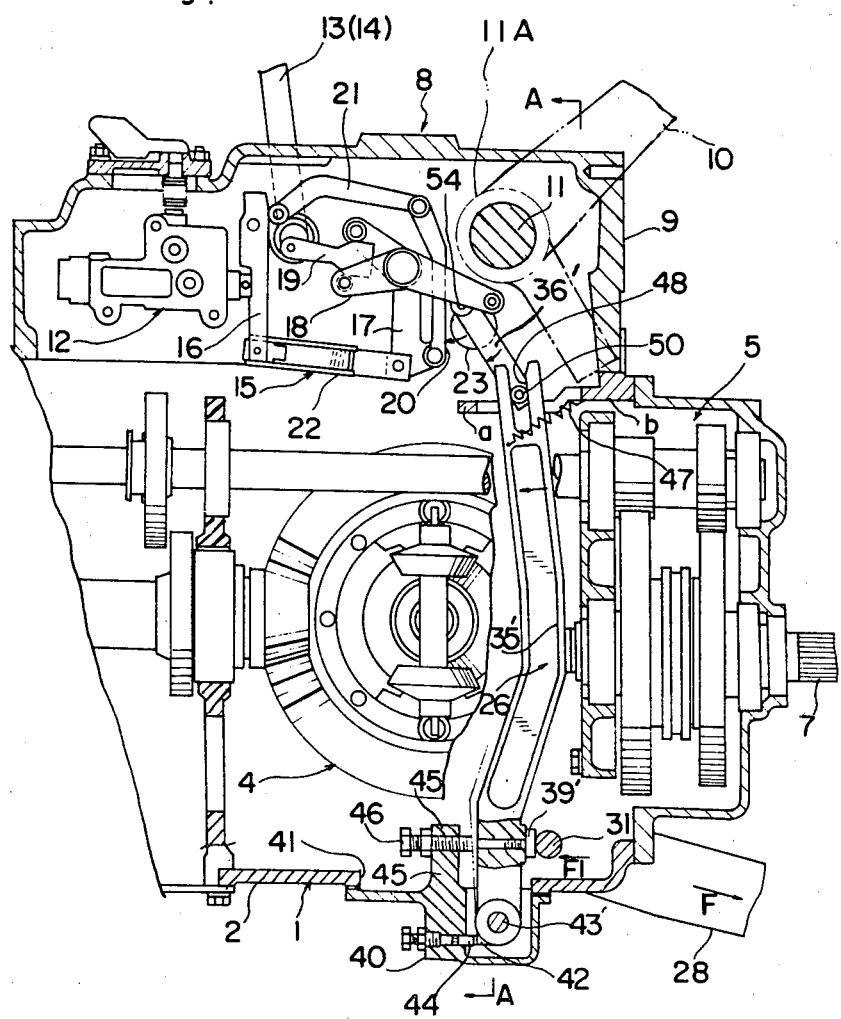
FIG. 2 is a general section view in side elevation of the tractive force sensing system of the present invention.
Figure 3:
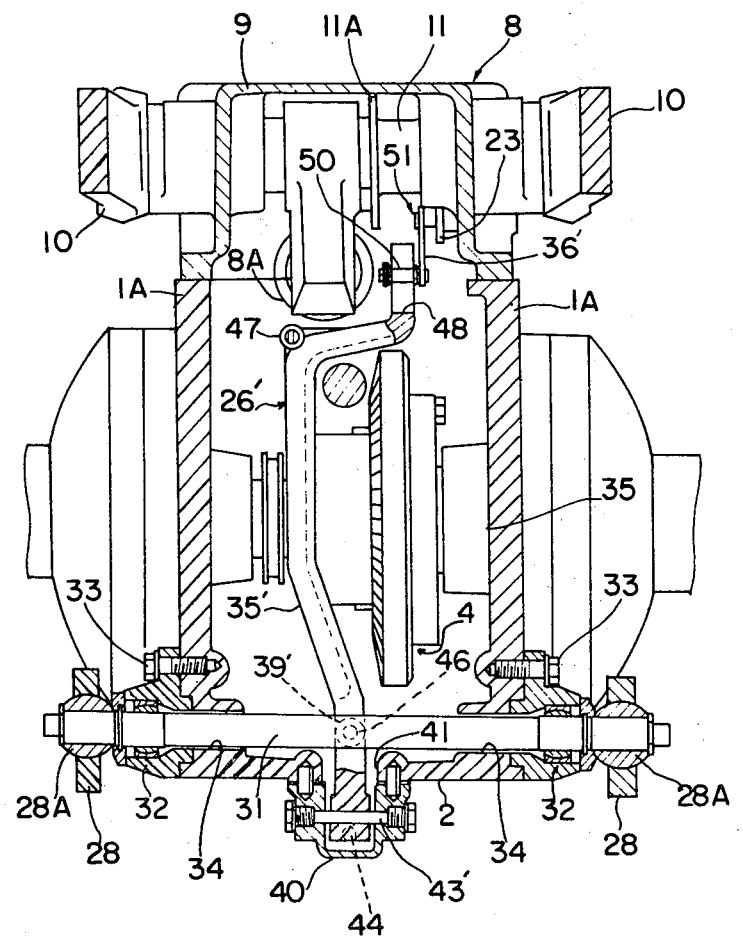
FIG. 3 is a section view taken along the line A—A of FIG. 2.

In FIGS. 1 to 3, a tractor vehicle body 1 is constituted by a transmission case 2. A rear wheel is generally designated by numeral 3.

The transmission case 2 incorporates a differential gear 4 for driving a wheel axle 6 and a PTO speed-change gear 5 for driving a PTO shaft 7, the PTO speed-change gear 5 being disposed at the rear side of the vehicle body 1. It is here to be noted that the term of "PTO" is an abbreviation of "power take-off".

A hydraulic device 8 is mounted on the top surface of the rear portion of the vehicle body 1. This hydraulic device 8 comprises a housing 9, a hydraulic cylinder means 8A having a cylinder, a piston, a piston rod and others all housed in the housing 9, and a pair of lift arms 10 for converting the sliding movement of the hydraulic cylinder means 8A into a vertical movement.

The housing 9 closes the upper opening of the transmission case 2, and an arm support shaft 11 is mounted to the housing 9.

The hydraulic cylinder means 8A is adapted to be set to a neutral position, a lifted position or a lowered position, by controlling the pressure of oil from a pump (not shown) by means of an oil pressure control valve 12 disposed in the housing 9. By the backward and forward rotation of position and draft control levers 13 and 14, a working machine to be discussed later will be controlled in position and draft.

As shown in FIG. 2, a control link means 15 housed in the housing 9 comprises a spool drive lever 16 pivotally supported at the upper portion thereof; a position balancer 18 which is, at one end thereof, slidably engaged with the position cam 11A of an arm support shaft 11, and is, at the intermediate portion thereof, pivotally supported by a spring connector 17 by the cross-shape member; a position connector 19 having one end pivotally supported by the shaft of the position control lever 13 and also having a cam surface engaged with both the spring connector 17 and the position balancer 18; a horizontal draft link 21 having one end pivotally supported by the shaft of the draft control lever 14 and the other end pivotally supported by a vertical draft link 20 which is pivotally supported by the spring connector 17; a push member 22 for interlockingly connecting the lower ends of the spool drive lever 16 and the spring connector 17 to each other; and a position feedback link (not shown) for interlockingly connecting the upper end of the spool drive lever 16 and the position cam 11A to each other.

A draft cam 23 in accordance with the present invention is disposed in the housing 9 through a support means. The draft cam 23 actuates the vertical draft link 20 to control the oil pressure control valve 12 through the control link means 15.

The draft cam 23 is one of the members for controlling, in a predetermined range, the tractive load of a working machine (not shown), for example a plough tractionally mounted through a three-point link 25. Tractive load F applied from lower links to be discussed later is sensed through a feedback interlocking link 26, and, through the draft cam 23, the control valve 12 actuates the hydraulic device 8 such that the lift arms are lifted.

The three-point link 25 comprises a top link 27 and a pair of lower links 28, of which intermediate portions are interlockingly connected to the lift arms 10 through lift rods 29.

As shown in FIG. 1, the top link 27 is removably pivoted to a mounting base 30 disposed at the rear portion of the vehicle body 1. The respective lower links 28 are removably pivoted by the both ends of a support 31 through ball joints 28A. Thus, a working machine (plough or rotary plough) is mounted to the three-point link 25.

As shown in FIG. 3, the support 31 insertingly passes through the inside of the lower portion of the vehicle body 1 and is horizontally mounted to the both lateral walls 1A of the vehicle body 1 through ball-joint type bearings 32. The bearings 32 are removably secured through bolts 33. There are provided gaps 34 between the support 31 and the vehicle body 1 and/or the bearings 32.

The lower link support 31 is substantially a load spring member and is made of a round bar adapted to be resiliently bent and deformed in the direction as shown by the arrow F1 in FIG. 2, by tractive load shown by the arrow F in FIG. 1 (in which the working machine attached is a plough, and if a rotary plough is attached, the direction of tractive load will become reversed). With the bearings 32 being utilized as end support beams, such tractive load F1 acts such that the axial center portion of the support 31 is bent and deformed.

The transmission case 2 has an opening 41 in the bottom thereof. A cross pivot shaft 43' is disposed at a pivot supporting box 40 attached to the opening 41. The lower end of a first beedback link 35' is pivotally connected to this pivot shaft 43'. Such pivotal point is located at a position lower than a follower cam 39'. Accordingly, the first feedback link 35' is correspondingly inclined in a forward direction by means of the force F1. Thus, the operational direction of the link 35' is opposite to the conventional one.

In this connection, a plurality of links 36 and 37 in the conventional system mentioned earlier can be simply formed into a second feedback link 36' alone in the present invention, so that the draft cam 23 may be directly actuated.

The pivot supporting box 40 is mounted to the central opening 41 of the transmission case 2 from the under side thereof such that the inside of the box 40 is communicated with the inside of the transmission case 2.

The pivot supporting box 40 is provided at the front thereof with a reset position stopper means 44 frontally faced to a stopper means 42 projectingly disposed at the lower end of the first feedback link 35', the reset position stopper means 44 being adjustably and threadedly mounted to the box frontal portion.

A projection 45 is projected from the box 40 into the transmission case 2. Threadedly fixed to this projection 45 is a movable over-movement restricting stopper means 46, which restricts, in a predetermined range, excessive movement of the first feedback link 35'.

The follower cam 39' is threadedly connected to the first feedback link 35' from the rear side, and has an arcuate back.

Figure 8:
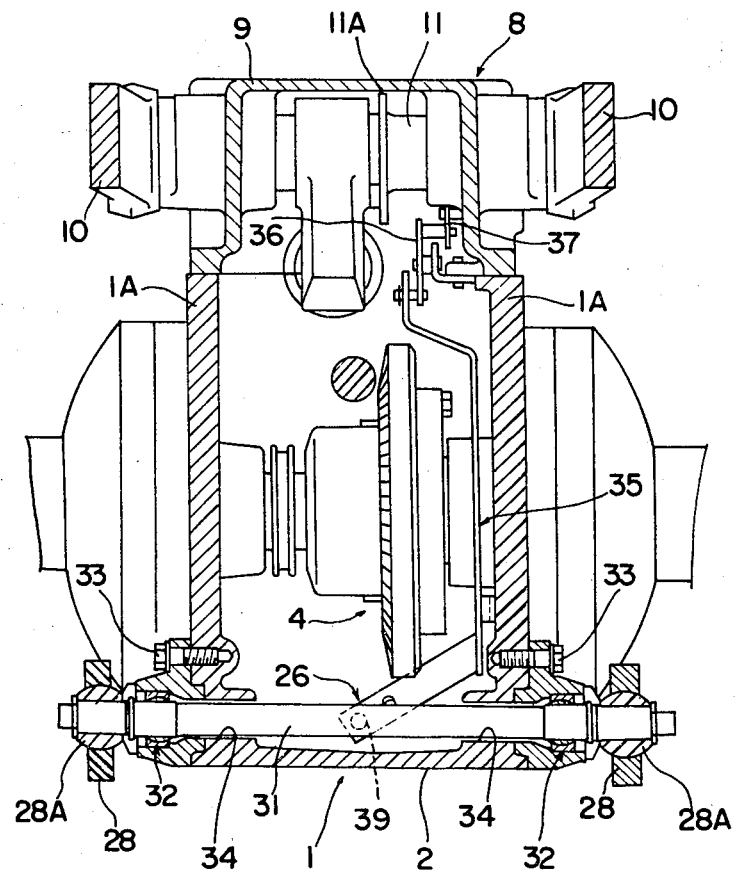
FIG. 8 is a section view taken along the line E—E of FIG. 7.

The first feedback link 35' has a roughly C-shape section in the range excluding the upper and lower ends thereof. While the first feedback link 35 in the conventional system is located at the right side with respect to the vehicle travelling direction as shown in FIG. 8, the first feedback link 35' in the present system is located at the relatively left side as shown in FIG. 3. A return spring 47 is disposed between the upper turning portion of the first feedback link 35' and the housing 9.

Figure 4:
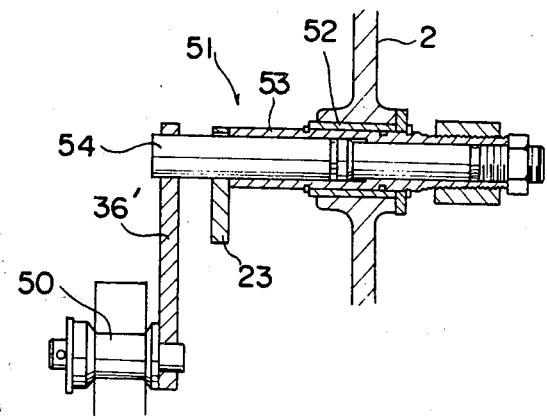
FIG. 4 is an enlarged section view of a support means.
Figure 5:
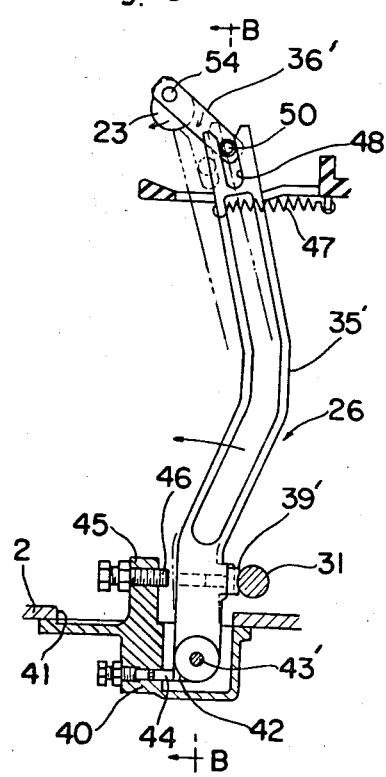
FIG. 5 is a section view in side elevation of main portions of the tractive force sensing system.
Figure 6:
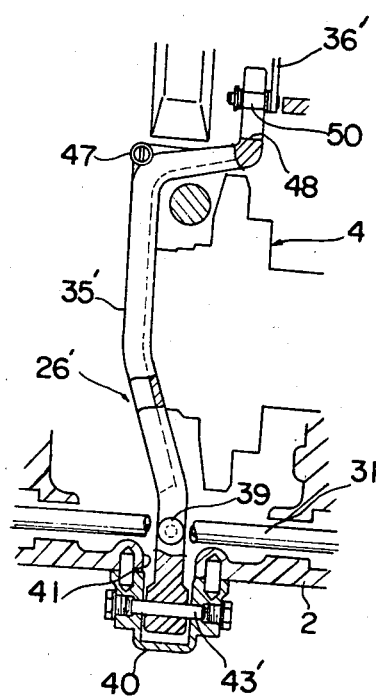
FIG. 6 is a section view taken along the line B—B of FIG. 5.
Figure 7:
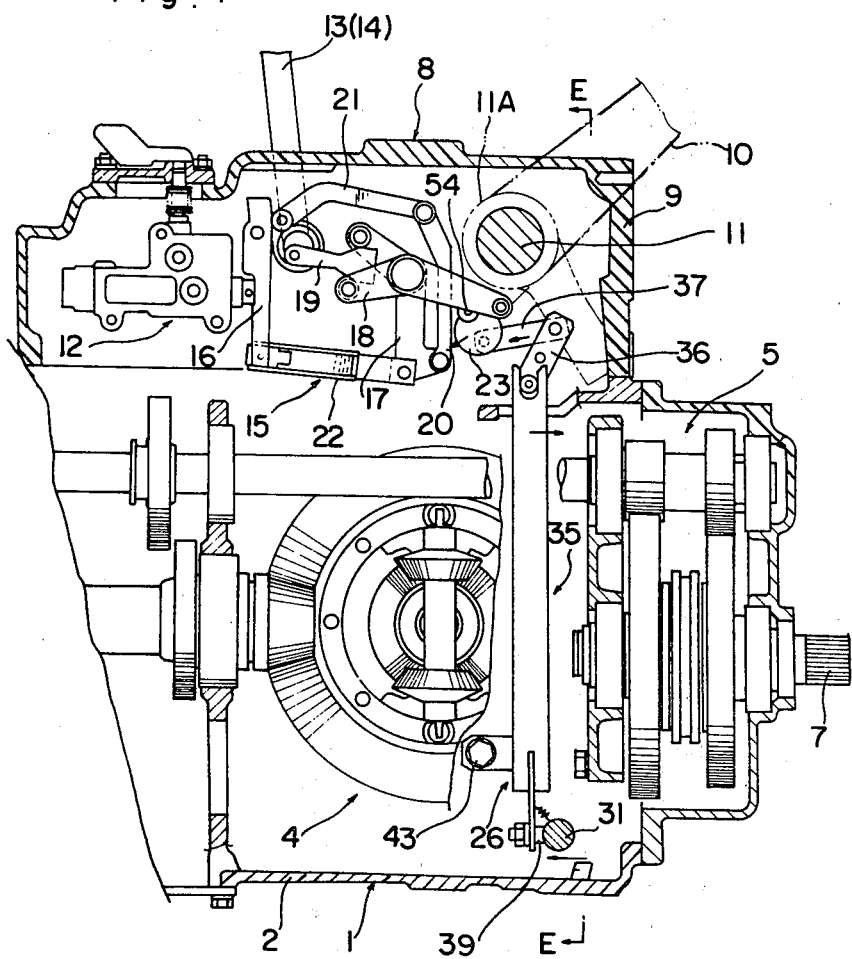
FIG. 7 is a general section view in side elevation of a conventional tractive force sensing system.

As conventionally done, the link 35' has in the upper end thereof an engagement groove 48 and is connected to the second link 36' through a roller 50. However, according to the present invention, the second link 36' is located inside the draft cam 23. Namely, as shown in FIG. 4, a support means 51 for these member abovementioned is constructed in a manner as follows.

A rotatable cylindrical cam support 53 is disposed through a bush 52 insertingly secured to the transmission case 2, and the draft cam 23 is integrally secured to the inner end of this cylindrical support 53. A link support shaft 54 is inserted in the cylindrical support 53, and is adapted to be rotated together with the draft cam 23. The second feedback link 36' is weldingly fixed to the inner end of the support shaft 54.

In such arrangement, a working machine (plough) is tractionally mounted through the three-point link 25. If load F exceeding a preset tractive force is applied during the time the working machine is operated, the support 31 serving also as load spring is subjected to a bending and deforming load F1 through the bearings 32, so that the follower cam 39' is pressingly moved forward. Subsequently, the first feedback link 35' is forwardly inclined with the lower pivotal point as a center. Correspondingly, the second feedback link 36' is rotated clockwise as shown in FIG. 2, with the link support shaft 54 as a center. With such rotation of the second link 36', the draft cam 23 is rotated. Then, through the control link mechanism 15 and others, the control valve 12 is actuated so as to lift up the lift arms 10, whereby the working machine is lifted up through the three-point link 25, thereby to reduce the tractive load.

In such a series of operations, the over-movement restricting stopper means 46 restricts the swing movement of the first feedback link 35' in a predetermined range, thereby to prevent overload and over-movement from being applied to the draft cam 23. Thus, the component elements and parts from the first feedback link 35' to the valve 12 may be protected against an excessive tractive force, so that there is provided a status where a constant force is applied in a predetermined operational range.

Accordingly, control can be precisely achieved. With the improvement in durability, such precise control can be maintained for a long period of time and replacement of the component elements and parts is less often required. Thus, there is provided a system which is more trouble free.

In particular, since the support 31 is disposed oppositely to the stopper means 46, such arrangement prevents the bending of the feedback link 35', and presents an advantage that there is no possibility of oil leaking.

It is to be noted that stopper means can be disposed at the portions *a* and *b* shown in FIG. 2.

Furthermore, the return spring 47 and the stopper means can be integrated into one structure.

I claim:

1. A tractive force sensing system for a tractor provided with a hydraulic device (8) having a draft control function to actuate an oil pressure control valve (12) through a draft cam (23) by tractive force (F) from a pair of lower links (28), said system comprising:
   a lower link support (31) passing transversely through the inside of a lower portion of a transmission case of a vehicle body (1), and adapted to be resiliently bent and deformed by said tractive load (F),
   a first feedback link (35') having a cam follower (39') in contact with an axially central region of said lower link support (31) and a bifurcated upper end defining an engagement groove, and
   a second feedback link (36') having an engagement member (50) engaging said groove, and operatively and directly connected to said draft cam (23),
   said transmission case (2) including an opening (41) in a bottom wall thereof, a box (40) being removably attached to said bottom wall across said opening such that said box (40) projects downwardly from said bottom wall,
   said first feedback link (35') having a lower end pivotally connected to said box (40) at a position below said lower link support (31), said box (40) including at least one stopper means (46) for restricting swinging movement of said first feedback link (35') in a predetermined range.

2. The system as set forth in claim 1, wherein the second feedback link (36') has one end fixed to a link support shaft (54) rotatably disposed to the wall of the transmission case (2), the draft cam (23) being fixed to said link support shaft (54).

* * * * *